United States Patent Office 3,578,610
Patented May 11, 1971

3,578,610
PROCESS FOR FABRICATION OF STOICHI-OMETRIC URANIUM MONOCARBIDE
Bruce M. Johnson, Michael A. De Crescenti, and James G. Darrah, Wethersfield, Conn., assignors to United Aircraft Corporation, East Hartford, Conn.
No Drawing. Filed Nov. 30, 1960, Ser. No. 72,798
Int. Cl. G21c 21/02; C01g 43/00
U.S. Cl. 264—.5    8 Claims This invention relates to nuclear reactor fuels and specifically to an improved process of fabricating stoichiometric uranium monocarbide for use as a nuclear reactor fuel.

Uranium monocarbide (UC) has many properties which make it very desirable as a fuel for a nuclear reactor.

Only two compounds, $USi_3$ and UN, have higher uranium loadings than UC. Its thermal conductivity, 0.7 cal./cm. ° C. sec., compares favorably with metallic fuels. This high-thermal conductivity combines with its high-melting point, approximately 4500° F., to work well in most heat-transfer considerations.

The object of this invention is to provide a process for the fabrication of stoichiometric, high-density UC, which overcomes many of the serious problems encountered in other fabrication techniques such as arc casting, swaging, extrusion and hot pressing.

Investigations with UC of varying carbon and oxygen contents show it to be necessary to use a powder with between 4.70 and 4.88% carbon and less than 0.2% oxygen. In order to maintain the required low-oxygen content, all possible handling and processing operations must be carried out under an inert gas cover or under vacuum. Investigation of the fabrication characteristics of various particle sizes, from plus 100 mesh to minus 400 mesh powders, show the minus 325 mesh fraction to give the best results.

After investigating pressing pressures from 40 to 120 tons per square inch (t.s.i.), pressures of 80 to 120 t.s.i. have been found to give a body with the greatest green strength. No binder is used because of the possibility of contamination of the UC by the decomposition products of the binder. It is, therefore, necessary to use a break-away type of die because of die friction encountered during ejection of the pellet from a standard die.

In practicing our improved method, the cold-pressed UC is placed in a vacuum resistance furnace and sintered at temperatures of 3500 to 3800° F. for from two to four hours in a vacuum of $10^{-4}$ to $10^{-6}$ mm. of Hg. The UC is placed during sintering on TaC which has been previously outgassed at temperatures in excess of 4000° F. In order to prevent the formation of large numbers of voids from CO release during sintering, it is necessary to use a heating rate of 20 to 30° F. per minute to bring the UC up to sintering temperature. This CO release comes from the reaction of $UO_2$ with UC to form CO and uranium.

The fuel element produced as a result of our improved process provides a very dense element which overcomes many problems hitherto encountered by previous fabrication techniques.

While we have described specifically the preferred method of carrying out our invention, it will be understood that various changes may be made in carrying out the several steps without departing from the scope of the invention as defined in the following claims.

We claim:
1. In a process for fabrication of stoichiometric uranium monocarbide, the steps of cold-pressing UC in a die in a vacuum under pressures from 40 to 120 tons per square inch, said UC having a carbon content between 4.70% and 4.88% and having less than 0.2% oxygen, and sintering the cold-pressed UC in a vacuum at temperatures between 3500 and 3800° F. for two to four hours in a vacuum between $10^{-5}$ to $10^{-6}$ mm. of Hg.

2. In a process for fabrication of stoichiometric uranium monocarbide, the steps of cold-pressing UC in a die in a vacuum under pressures from 40 to 120 tons per square inch, said UC having a carbon content between 4.70% and 4.88% and having less than 0.2% oxygen, and sintering the cold-pressed UC in a vacuum at temperatures between 3500 and 3800° F. for two to four hours in a vacuum between $10^{-5}$ to $10^{-6}$ mm. of Hg using a heating rate of 20 to 30° F. per minute to bring the cold-pressed UC up to sintering temperature.

3. In a process for fabrication of stoichiometric uranium monocarbide, the steps of cold-pressing UC in a die in a vacuum under pressures from 40 to 120 tons per square inch, said UC having a carbon content between 4.70% and 4.88% and having less than 0.2% oxygen and having particle sizes between plus 100 mesh and minus 400 mesh powders, and sintering the cold-pressed UC in a vacuum at temperatures between 3500 and 3800° F. for two to four hours in a vacuum of between $10^{-5}$ to $10^{-6}$ mm. of Hg.

4. In a process for fabrication of stoichiometric uranium monocarbide, the steps of cold-pressing UC in a die in a vacuum under pressures from 40 to 120 tons per square inch, said UC having a carbon content between 4.70 and 4.88%, maintaining the oxygen content of the UC below 0.2% by carrying out all handling and processing operations in the absence of oxygen, said UC also having particle sizes between plus 100 mesh and minus 400 mesh powders, placing the cold-pressed UC in a vacuum and sintering at temperatures between 3500 and 3800° F. for from two to four hours in a vacuum of between $10^{-5}$ and $10^{-6}$ mm. of Hg, placing the UC on TaC during sintering which has been previously outgassed at temperatures in excess of 4000° F.

5. In a process for fabrication of stoichiometric uranium monocarbide, the steps of cold-pressing UC in a die in a vacuum under pressures of between 80 and 120 tons per square inch, said UC having a carbon content of between 4.70% and 4.88% and having less than 0.2% oxygen, and placing the cold-pressed UC in a vacuum and sintering at temperatures between 3500 and 3800° F. for two to four hours in a vacuum of between $10^{-5}$ and $10^{-6}$ mm. of Hg using a heating rate of 20 to 30° F. per minute to bring the cold-pressed UC up to sintering temperature.

6. In a process for fabrication of stoichiometric uranium monocarbide, the steps of cold-pressing UC in a break-away type of die in a vacuum under pressures from 80 to 120 tons per square inch, said UC having a carbon content between 4.70 and 4.88% and less than 0.2% oxygen and having particle sizes of about minus 325 mesh fraction with no binder, and placing the cold-pressed UC in a vacuum and sintering at temperatures between 3500 and 3800° F. for two to four hours in a vacuum of between $10^{-5}$ and $10^{-6}$ mm. of Hg at a heating rate of 20 to 30° F. per minute, placing the UC on TaC during sintering which has been previously outgassed at temperatures in excess of 4000° F.

7. In a process for fabrication of stoichiometric uranium monocarbide, the steps of cold-pressing UC in a die in the absence of oxygen and under pressure, said UC having a carbon content between 4.70% and 4.88% and less than 0.2% oxygen, and sintering the cold-pressed UC in a vacuum at temperatures between 3500 and 3800° F. for two to four hours in a vacuum between $10^{-4}$ to $10^{-6}$ mm. of Hg using a heating rate of 20 to 30° F. per minute.

8. In a process for fabrication of stoichiometric uranium monocarbide elements, the step of cold-pressing UC in a die in the absence of oxygen and under pressures from 40 to 120 tons per square inch, said UC having a carbon content between 4.70% and 4.88% and less than 0.2% oxygen and having particle sizes passing 100 mesh, and sintering the cold-pressed UC in a vacuum at temperatures between 3500 and 3800° F. for two to four hours in a vacuum of between $10^{-4}$ and $10^{-6}$ mm. of Hg.

References Cited

Finniston et al.: "Metallurgy and Fuels," Series V—Progress in Nuclear Energy, pps. 437, 444, 445 (1956). Copy in PUSL.

ORO 212, pps. 1, 6–8, Sept. 15, 1959. Copy in Div. 46.
ORO 254, p. 6, Jan. 1, 1960. Copy in Div. 46.
BMI—1441, pps. 77, 78, 81–86, 88, 89, May 31, 1960.
NYO 2688, pps. 1, 3, 10, 12, 15, 21, 23, June 13, 1960.

LELAND A. SEBASTIAN, Primary Examiner

U.S. Cl. X.R.

23—349; 176—90; 252—301.1